United States Patent [19]
Burtin

[11] Patent Number: 5,021,823
[45] Date of Patent: Jun. 4, 1991

[54] PHOTOGRAPHIC EXPOSURE APPARATUS
[75] Inventor: Jean Burtin, Mol, Belgium
[73] Assignee: AGFA-Gevaert, N.V., Mortsel, Belgium
[21] Appl. No.: 591,937
[22] Filed: Oct. 2, 1990
[51] Int. Cl.$^5$ .................. G03B 27/72; G03B 27/80
[52] U.S. Cl. ............................. 355/69; 355/83
[58] Field of Search ......................... 355/69, 83
[56] References Cited

U.S. PATENT DOCUMENTS 3,764,210 10/1973 Nakamura ........................ 355/69
4,933,607 6/1990 Vogel ............................. 355/69 X Primary Examiner—Richard A. Wintercorn
Attorney, Agent, or Firm—William J. Daniel

[57] ABSTRACT

A photographic exposure apparatus includes a lamp housing for a metal-halide discharge lamp for exposing a light-sensitive film to an image-bearing sheet when the lamp is energized to full power, a shutter for closing the lamp housing while the lamp remains energized at a lower power level in stand-by condition, and a control unit for energizing of the lamp in standby condition in such a way that, while being maintained at reduced power, the lamp is intermittently energized at high power during short intervals, e.g. in pulses, to thereby substantially prolong the working life of the lamp.

8 Claims, 3 Drawing Sheets

PHOTOGRAPHIC EXPOSURE APPARATUS

BACKGROUND OF THE INVENTION

1. Field of the Invention

The present invention relates to a photographic exposure apparatus which comprises an UV-emitting metal-halide discharge lamp for exposing a radiation-sensitive film in contact with a transparent image-bearing sheet.

2. Description of the Prior Art

Known photographic exposure apparatus comprise means for holding a transparent image-bearing sheet in tight contact with a light-sensitive film, a lamp housing with an UV-emitting metal halide discharge lamp for carrying out the exposure of the light-sensitive film to the image-bearing sheet, a shutter for closing the lamp housing, forced air cooling means, an adjustable electric power supply for the lamp and control means for controlling the power supply and the shutter, so that the shutter is open and the lamp is operated at full power during the exposure of the light-sensitive film and the shutter is closed and the lamp is kept energized at reduced power during standby of the apparatus, i.e. between successive exposures.

The reason for the operation of the lamp at reduced power during the periods of non-exposure is as follows.

Metal halide discharge lamps have a high radiation efficiency compared with the low-pressure pulsed xenon discharge lamps used on a vast scale for the copyboard lighting of cameras or copyboards. They have, however, one major drawback: they need a running-up time of several minutes and cannot be re-ignited at once without using a high voltage, so that frequent switching is impossible without special measures.

A solution to this problem is to have the lamps permanently burning when the apparatus is in use and to provide the lamp housing with a shutter, which is closed during preparations for the next exposure. In these intervals the lamps are automatically switched to a fraction of full power.

The choice of the power level to which a lamp is energized during its standby position is delicate. On the one hand, this power level should high enough to maintain the bulb of the lamp at a temperature that is high enough to keep the halogen cycle of the lamp going on. On the other hand, this power should be low enough so as not to cause thermal damage to the reflector components of the lamp housing when strongly heated because of the shutter which closes the outlet opening of the lamp housing so that the radiant energy of the lamp remains when within the housing.

Practice has shown that a lamp wattage that still does not cause deterioration of reflector and other parts of the lamp housing, is not really sufficient to maintain a satisfactory halogen cycle in the lamp. This results in a premature blackening of the lamp bulb by deposits of evaporated metal from the electrodes of the lamp. Therefore, the nominal or expected lifetime of the lamp as indicated by the manufacturer is by far not attained.

A typical lifetime of a medium-pressure metal-halide lamp is about 750 h at 5% failure and at a radiation maintenance of 85%. This data is valid, however, for operation of a lamp in almost ideal circumstances, i.e. uninterrupted operation and optimum cooling.

Practice shows that the operational lifetime of this type of lamp in a photographic exposure apparatus under normal working conditions sometimes hardly reaches 400 h. This value stands for the number of hours the exposure apparatus is in use. Since in real terms effective exposure times range only from 5 to 10% of the total period of use, this means that the effective exposure time of a lamp may become as short as 20 to 40 h.

SUMMARY OF THE INVENTION

It is the object of the invention to provide an improved photographic exposure apparatus, in which the lifetime of the exposure lamp under normal working conditions is substantially increased.

STATEMENT OF THE INVENTION

A photographic exposure apparatus, comprising means for holding a transparent image-bearing sheet in tight contact with a radiation-sensitive film, a lamp housing with an UV-emitting metal halide discharge lamp for carrying out the exposure of the radiation-sensitive film to the image-bearing sheet, a shutter for closing the lamp housing, an adjustable electric power supply for the lamp and control means for controlling the power supply and the shutter so that the shutter is open and the lamp is operated at full power during the exposure of the photographic film, and the shutter is closed and the lamp is kept energized at reduced power during the standby of the apparatus, i.e. between successive exposures, is characterized in that the control means are arranged for controlling the energizing of the lamp in standby so that in addition to the reduced power the lamp is intermittently energized at high power during short intervals.

It has been found that the described treatment may lead to a substantial increase of the operational lifetime of a lamp.

In some cases, the exposure apparatus could be in use for more than 5000 h without replacing the lamp, which means that its real lifetime at an effective use of 10% amounted to more than 500 h. These values were obtained without carrying out any modification to the lamp housing itself.

The result of the inventive measure is surprising. The intermittent energizing of the lamp at high power may be so small, e.g. only 10% of nominal power added to the standby power, that additional power of that magnitude if applied in a continuous way to the lamp during standby, would not cause any noticeable increase in lifetime. Apparently, the described improvement is achieved by applying this extra power to the lamp in intermittent high level form. The use of the high power on an intermittent basis does not cause any thermal harm to the lamp housing which is closed by the shutter in standby.

The notion "full power" as used in the statement of this invention stands for the power at which the lamp is used during exposure of the film. This power may be the nominal lamp wattage, as indicated by the manufacturer of the lamp, or a slightly larger or smaller wattage, depending on how the manufacturer of the exposure apparatus designed the lamp housing, its cooling, and its power supply.

The notion "high power" indicates that the power during the intermittent energizing must not be exactly equal to the "full power" as defined hereinbefore, but may slightly differ therefrom. For instance, the high power may be between 80% and 110% of the full power.

Preferred but optional features of the invention are as follows.

The ratio between the periods of high and reduced power during standby in any case is less than 0.5 and preferably less than 0.2.

The period of intermittence during standby i.e. separating high power pulses is between 2 and 10 minutes.

The period of each high power pulse during standby is between 10 and 60 seconds.

The description of the invention hereinafter specifically refers to a medium-pressure metal halide discharge lamp with iron iodide and cobalt iodide additives, but it is to be understood that metal halide discharge lamps with other additives, such as lead iodide and gallium iodide, are equally within the scope of the present invention.

BRIEF DESCRIPTION OF THE DRAWINGS

The invention will be described hereinafter by way of example with reference to the accompanying drawings, wherein.

DETAILED DESCRIPTION OF THE INVENTION

Figure 1:
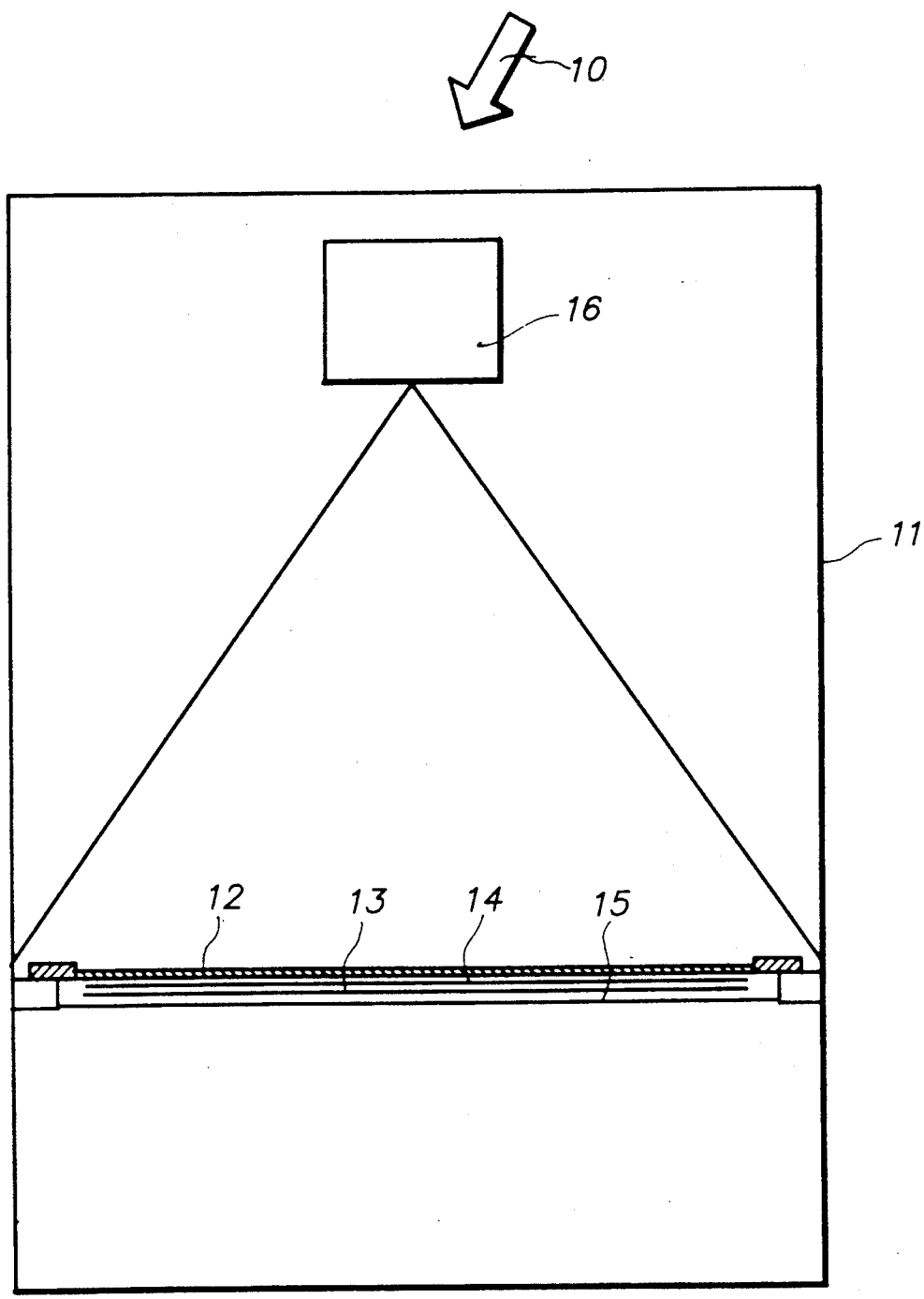
FIG. 1 is a diagrammatic illustration of one embodiment of a top-light photographic exposure apparatus.

The apparatus illustrated by way of embodiment in FIG. 1 is a so-called top-light exposure apparatus.

The apparatus, generally designated by the numeral 10, is mounted within a cabinet 11 having a glass exposure plate 12 that can be pivoted upwardly to enable the operator to locate a radiation-sensitive film 13 and a transparent sheet 14 which bears the image to be exposed brought in contact with each other on a blanket 15 through the open frontside of the cabinet. As the glass plate 12 has been lowered on the combination of both sheets, a vacuum may be established between the glass plate and the blanket in order to urge both sheets tightly in contact with the glass plate.

Figure 2:
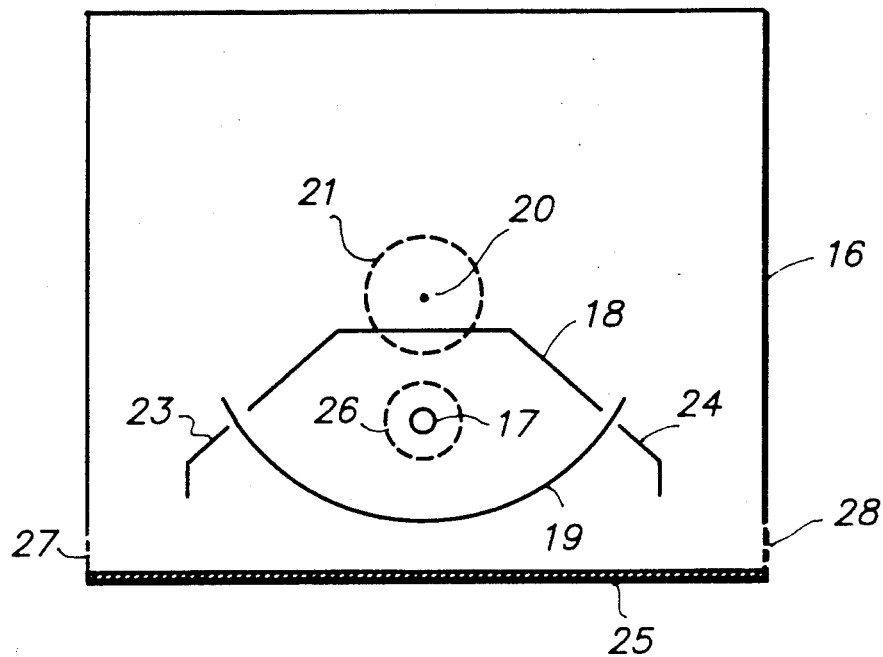
FIG. 2 is a diagrammatic illustration of the lamp housing of the apparatus according to FIG. 1.

A lamp housing 16 mounted on the top of the cabinet, comprises a tube-like discharge lamp 17 (see FIG. 2), a reflector 18, a shutter 19 which can be pivoted around a horizontal axis 20 and which is operated by an electric motor 21, distal reflector sections 23 and 24 and a protective glass plate 25.

A blower (not illustrated) is mounted with its suction opening (illustrated by the circle 26 in broken lines) at the outside of a lateral wall of the lamp housing and draws cooling air that enters the housing through the slotlike openings 27 and 28 between the glass plate 25 and the lower edges of the vertical walls of the housing and that strikes along the lamp and the reflector parts of the housing.

Not illustrated in the drawing are separate cooling channels that direct an extra stream of forced cooling air onto the lamp pinches in order to keep their temperature low enough, as known in the art.

The shutter is formed by a sheet of aluminium that is cylindrically curved around the axis 20 and that may be pivoted by the motor 21 out of the opening of the reflector 18.

The shutter does not provide a competency lighttight closure of the lamp housing, so that during preparations for the next exposure the lamp housing still emits a certain amount of actinic light. Such emission is harmless in the apparatus under consideration as the latter in fact is destined for daylight processing of photographic contact printing material, more especially for contact printing and dry retouching. One example of a system in which both operations are integrated is PRINTON DESC (PRINTON is a trade name of AGFA-GEVAERT NV, Mortsel, Belgium), an acronym for "PRINTON Dry Etching System by Computer" or in other words a computer-controlled working station for dry etching. The work station comprises four elements: a contact exposure cabinet, a densitometer with a light table, a computer with a monitor and a working table.

The exposure apparatus described hereinbefore comprises in practice numerous other elements that are indispensable for its proper working, such as a UV-absorbing screen in the front opening of the cabinet to protect the operator's eyes during exposure, means for pivoting this screen away, a vacuum source for withdrawing the air from the exposure frame, display means for signalling the status of the apparatus to the operator, an exposure timer, etc. All these expedients are known in the art and their further description is unnecessary for understanding the operation of the present embodiment of the invention.

Figure 3:
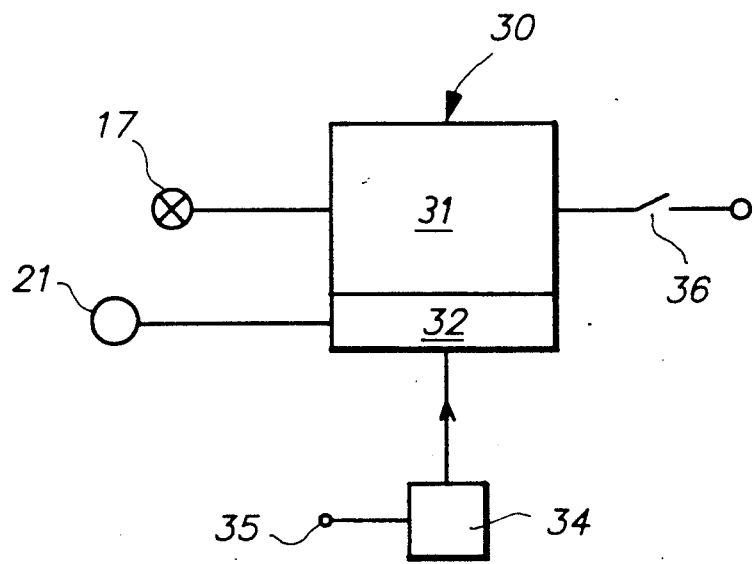
FIG. 3 is a block diagram of the electric control of the lamp housing.

FIG. 3 illustrates schematically the control unit for the lamp housing.

An electric power supply 30 has a section 31 which provides an adjustable power for the exposure lamp 17 and a section 32 for fixed voltages for the operation of the shutter motor 21, the blower, a microprocessor, etc. A controller 34 controls the operation of the power supply upon command of an exposure initiation switch 35.

The operation of the circuit is as follows.

As soon as the main switch 36 is closed, the power section 31 produces a high voltage peak igniting the lamp 17. At the same time the blower for cooling the lamp housing is started and the shutter 21 is closed.

The warming-up of the lamp takes a few minutes after which the apparatus is ready for use. This may be signalled by appropriate means.

Figure 4:
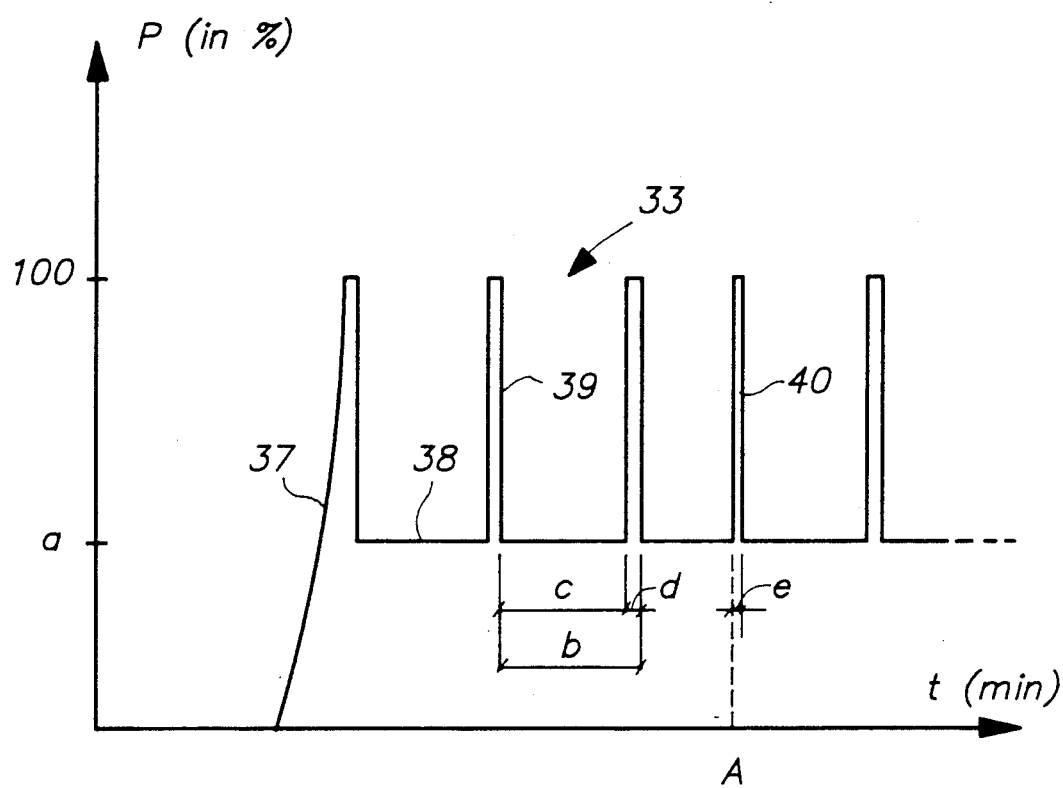
FIG. 4 is a diagram illustrating the electric power of the lamp as a function of time.

The described warming-up phase and the corresponding increase of power supplied to by the lamp is illustrated by the section 37 of the curve 33 of FIG. 4 which is a diagram representing the relative power P consumed by the lamp as a function of time. The top of the section 37 represents the full power of the lamp, i.e. the power which will be used for carrying out the exposure.

As soon as the lamp is ready for exposure, the system goes into the standby phase until the first exposure is to be made.

The electric power level of the lamp during the standby period is as follows.

Firstly, the curve 33 comprises a continuous, uniform component 38 amounting to a% of the full power.

Secondly, the curve comprises a second component 39 of high power which occurs intermittently e.g. as pulses. The period of intermittence is indicated by b, and the ratio between the periods of high and reduced power is d:c. The high power may, as already mentioned hereinbefore, be equal to the full power or deviate therefrom by a value up to approximately 10%.

The moment of the first exposure is arbitrarily indicated by point A on the time axis. The lamp gets full power indicated by the curve section 40 during the exposure period e, the duration of which depends on a number of factors known in the art, such as the sensitivity of the radiation-sensitive film, the optical density of the image-bearing sheet, the characteristics of the apparatus, etc.

As the exposure is finished, the apparatus returns to the standby phase until the next exposure is to be made.

The performance of the lamp was tested in a photographic exposure apparatus of the type PRINTON DESC, CDL 1502, manufactured by Agfa-Gevaert N.V., Mortsel-Belgium, intended for dry etching reprographic work.

The following data characterize the apparatus:
  Working size of contact table: 66×80 cm
  Light source: metal halide lamp of the type HPA 1200 R with iron and cobalt additives
  Power supply section 31: controlled by phase cutting at mains frequency
  Maximum power on the film surface under the glass plate: 4000 uW/cm2
  Full power: 1200 W
  Reduced power (a=42): 500 W
  Intermittence period b: 300 s
  Ratio of high to reduced period (d:c): 0.1
  High power (pulses 39): 1000 W
  Exposure times (e): adjustable between 5 and 300 s.

It has been shown that the lamp attained a lifetime exceeding beyond 5000 h in exposure apparatus of the described type. It is to be understood that this lifetime stands for the total amount of working hours of the apparatus, in other words: for 8-h working days and 5-day weeks, this means more than four months of service-free use of the apparatus.

The present invention is not limited to the apparatus described hereinbefore.

The apparatus may also be of a bottom-light type.

The apparatus may comprise more than one lamp.

The lamp(s) may comprise other additives than the described ones, such as lead iodide and gallium iodide already mentioned.

The adjustable power supply may also be a so-called switched-mode power supply, delivering a pulsed D.C. output at a high frequency, e.g. a frequency of 20 kHz.

I claim:

1. A photographic exposure apparatus, comprising means for holding a transparent image-bearing sheet in tight contact with a radiation-sensitive film, a lamp housing (16) with a UV-emitting metal halide discharge lamp (17) for carrying out the exposure of the radiation sensitive film to the image-bearing sheet, a shutter (19) for closing the lamp housing, an adjustable electric power supply (31) for the lamp and control means (34) for the power supply and the shutter (21), so that the shutter is open and the lamp is operated at full power during exposure of the photographic film and the shutter is closed and the lamp is kept energized at reduced power while the apparatus is in standby condition, between successive exposures, characterized in that the control means (34) is arranged for controlling the energizing of the lamp in standby condition in such a way that, in addition to the reduced power, the lamp is intermittently energized at high power during short intervals.

2. Apparatus according to claim 1, wherein the high power is between 90 and 110% of the full power.

3. A photographic apparatus according to claim 1, wherein the ratio between the periods of high and reduced power during standby is less than 0.5.

4. A photographic apparatus according to claim 1, wherein the ratio between the periods of high and reduced power during standby is less than 0.2.

5. Apparatus according to claim 1, wherein the period of intermittence during standby is between 2 and 10 minutes.

6. Apparatus according to claim 1, wherein the period of high power during standby is between 10 and 60 seconds.

7. Apparatus according to claim 1, wherein the reduced power during standby is not larger than 50% of full power.

8. Apparatus according to claim 1, wherein the lamp is a medium-pressure metal halide lamp with iron iodide and cobalt iodide additives.

* * * * *